United States Patent [19]
Schnizlein et al.

[11] Patent Number: 5,502,409
[45] Date of Patent: Mar. 26, 1996

[54] CLOCK SWITCHER CIRCUIT

[75] Inventors: Paul G. Schnizlein; David E. Norris, both of Austin, Tex.

[73] Assignee: Advanced Micro Devices, Sunnyvale, Calif.

[21] Appl. No.: 364,436

[22] Filed: Dec. 27, 1994

Related U.S. Application Data

[63] Continuation of Ser. No. 26,493, Mar. 4, 1993, abandoned.

[51] Int. Cl.$^6$ ...................................................... H03K 5/13
[52] U.S. Cl. .............................. 327/99; 327/298; 327/217
[58] Field of Search ............................... 327/99, 299, 294, 327/298, 217

[56] References Cited

U.S. PATENT DOCUMENTS

| | | | |
|---|---|---|---|
| 4,229,699 | 10/1980 | Frissell | 307/243 |
| 4,855,616 | 8/1989 | Wang et al. | 307/269 |
| 4,970,405 | 11/1990 | Hagiwara | 328/137 |
| 4,979,194 | 12/1990 | Kawano | 328/61 |
| 5,099,140 | 3/1992 | Mudgett | 307/269 |

OTHER PUBLICATIONS

IBM Technical Disclosure Bulletin, vol. 32, No. 9B, Feb. 1990, pp. 82–84.

Primary Examiner—Peter S. Wong
Assistant Examiner—Shawn Riley
Attorney, Agent, or Firm—H. Dale Langley, Jr.

[57] ABSTRACT

A clock switcher circuit for providing at least one set of clock signals selected from a plurality of clock sources. A first clock signal having a first pulse length and a second clock signal having a second pulse length are circuit inputs. Another circuit input is a clock selection input. When the clock selection input indicates a new output clock signal, different from the then current output clock signal, should be output by the circuit, the circuit provides a means for switching to output the new output clock signal. In switching to output the new output clock signal, the circuit prevents the occurrence of the output clock signal ever having a pulse shorter than the normal pulse length of the then current output clock signal, whether the then current output clock signal is the first clock signal or the second clock signal.

10 Claims, 5 Drawing Sheets

CLOCK SWITCHER CIRCUIT

This is a continuation of U.S. application Ser. No. 08/026,493, filed Mar. 4, 1993, now abandoned.

BACKGROUND OF THE INVENTION

1. Field of the Invention

The invention relates to a clock switcher electrical circuit which allows for switching between clock signals of a plurality of clock signal sources, and, more particularly, such a clock switcher circuit which allows for switching between clock signals of the plurality of clock signal sources without resulting in arbitrarily short clock pulses.

2. Description of the Related Art

In digital electronic circuits, clock sources provide pulsed timing signals which allow for appropriate timing and ordering of events occurring within the circuits. It is desirable in certain of those circuits to allow the clock source for the circuit to be switched from time to time between any of a plurality of clock sources. It is hard, if not impossible, to exactly synchronize timing signals generated by more than one clock. Therefore, switching between clock sources can result in arbitrarily shortened or lengthened pulses during the switch.

The problem with arbitrarily shortened or lengthened pulses during a switch between clock sources is that operations within particular circuits may necessarily depend upon an absolute time, i.e., pulse length, for appropriate completion of the steps of those operations. For example, in the case of a shortened clock pulse during a switch between clock sources, some flip flops of a certain circuit block will see the pulse but others may not since the pulse is shorter than the normal pulse. This problem could be prevented if one could sufficiently study the circuit block to confirm that all flip flops will see every possible arbitrarily shortened pulse; however, such a study is not practical in most cases and may even be impossible. A lengthened pulse typically does not present the problems which may result in the case of a shortened pulse. It is, therefore, in most cases suitable to have arbitrarily lengthened pulses and still guarantee appropriate circuit block operation. Arbitrarily shortened clock pulses, on the other hand, are a problem.

Others have attempted to resolve the problem of arbitrarily shortened clock pulses during switching between clock sources. One example of such an attempt disclosed in U.S. Pat. No. 5,099,140 to Mudgett. That patent discloses a synchronizing circuit, responsive to a detector for disabling a gate in synchronism with the old clock source and thereafter enabling the gate in synchronism with a new clock source. In the case of that solution, synchrony of the signals from the clock sources is mimicked by the particular circuit due to the disabling and then enabling of the gate. Though the mimicking circuitry of this patent may work in certain applications, it may not be suitable for others.

An example of a circuit block in which switching between clock sources may be necessary is a circuit block which does data formatting for a communication channel. In such a communication channel, data bytes that are to be communicated must appear at the right place within the circuit block at the right relative time. When such a circuit block must switch between clock sources, the various clock sources must in some manner be interrelated so that switching between the clock sources does not disrupt the timing of the circuit block, causing disruption of appropriate data formatting by the block.

In a more specific example of this type communication channel, the protocol on the communication channel dictated by the circuit block requires that the block, at times, be the timing master dictating the timing of the communication channel and, at other times, be the timing slave. When the block is the timing slave in this example communication channel, the timing for the block comes from clock recovery circuitry which is a phase-locked loop that recovers the timing from the channel. Because the channel specifies the timing in this instance when the block is the timing slave, it may be necessary to switch between clocks from time to time to achieve the particular timing designated by the clock recovery circuitry. When the block in this example serves as the timing master, however, the block uses whatever clock is providing signals at the time and no switching between clocks is then necessary. So with such a circuit block for a communication channel, the block must be run at various times on one of two or more different clocks and must periodically switch between those different clocks.

The present invention provides a clock switcher circuit which eliminates the possibility of arbitrarily short clock pulses upon switching between clocks. The present invention, thus, provides an improved apparatus and method for switching between clock sources which provide signals to a circuit block.

SUMMARY OF THE INVENTION

To overcome the aforementioned problems, the present invention generally provides a clock switcher circuit which allows for switching between clock signals of a plurality of clock signal sources without resulting in arbitrarily short clock pulses.

In one aspect, the invention is a clock switcher circuit for providing at least one set of clock signals selected from a plurality of clock sources. The clock switcher circuit prevents the occurrence of a shorter pulse length than that of an old clock source, upon switching to a new clock source. The circuit includes a flip-flop means for holding a state indicating which of the plurality of clock sources is then being used to provide the at least one set of clock signals, comparing the state to a selector signal indicating which of the plurality of clock sources should be used, and generating a mismatch signal if the state differs from the selector signal; a gate means for selectively outputting at least one response signal in response to the mismatch signal from the flip-flop means, the gate means having inputs of the selector signal, the mismatch signal, and the at least one set of clock signals; an SR latch means for generating at least one set/reset output signal, the SR latch means having inputs of the at least one response signal, the at least one set/reset output signal being looped to set the gate means; and a MUX means for generating the at least one set of clock signals, the MUX means having inputs of the plurality of clock sources, and the at least one set/reset output signal, the at least one set of clock signals generating the state of the DFA flip-flop means.

In another aspects, the circuit is operable with multi-phase clocks.

In yet another aspect, the circuit chooses between any of a plurality of clock inputs as the at least one set of clock signals.

In yet another aspect, the invention is a circuit for outputting a selected clock signal, the selected clock signal being a pulsed signal, comprising a plurality of clock inputs, each of the inputs being pulsed signals; a signal indicating which of the plurality of clock inputs is to be output by the circuit; a means for generating the selected clock signal from the plurality of clock inputs; and a means for switching the selected clock signal to another of the plurality of clock inputs if the selected clock signal differs from the clock input generated by the means for generating.

In yet another aspect, the circuit further comprises a means for preventing the means for switching from switching the selected clock signal to another of the plurality of clock inputs if the switching would cause the selected clock signal to generate a pulse signal less than the normal pulse signal of the selected clock signal.

In an even further aspect, the circuit is operable with multi-phase clock inputs.

In another aspect, the invention is a circuit for outputting a clock signal. The circuit comprises a first clock signal input having a first pulse length; a second clock signal input having a second pulse length; a clock selection input; a means for outputting whichever of the first clock signal input or the second clock signal is indicated by the clock selection input; and a means, responsive to the clock selection input, for preventing the means for outputting from switching between the first clock signal input to the second clock signal input until the second pulse length output by the means for outputting will be at least as long as the first pulse length and from switching between the second clock signal input to the first clock signal input until the first pulse length output by the means for outputting will be at least as long as the second pulse length.

In another aspect, the first clock signal input and the second clock signal are multi-phase clocks.

In an even further aspect, the circuit further comprises a plurality of additional clock signal inputs each having a particular pulse length, wherein the clock selection input selects any of the plurality to be the output clock signal and the output clock signal has a pulse length at all times at least as great as the pulse length of any of the plurality.

In yet even another aspect, the plurality are multi-phase clocks.

BRIEF DESCRIPTION OF THE DRAWINGS

For a more complete understanding of the present invention and for further objects and advantages thereof, reference may now be had to the following description in conjunction with the accompanying drawings, in which.

DETAILED DESCRIPTION OF THE INVENTION

Figure 1:
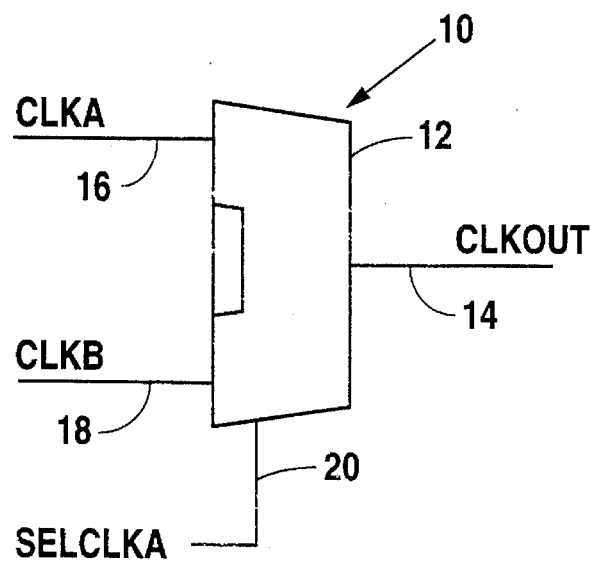
FIG. 1 is a simplified block diagram illustration of a prior art clock selector circuit.

In order to understand the principles and advantages of the present invention, it is helpful to first consider a prior art clock switcher circuit and its performance characteristics. Referring first to FIG. 1, such a prior art clock switcher circuit 10 is shown in simplified form. The prior art switcher circuit 10 includes a clock source select means 12. A selector 20 triggers the clock source select means 12 to select one of the two clock inputs 16, 18 to yield an appropriate clock output 14.

Figure 2:
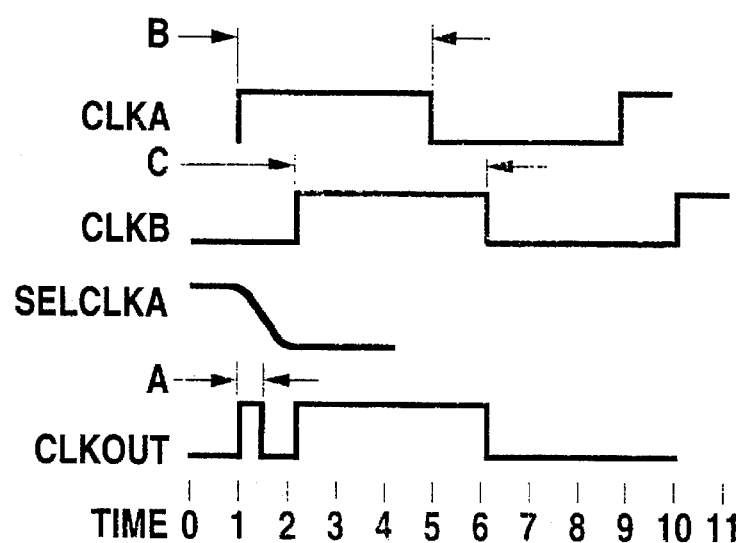
FIG. 2 illustrates the waveform over time of the clock inputs and the circuit output of the prior art clock selector circuit of FIG. 1 during a switch from one clock input to a different clock input.

Referring next to FIG. 2, signal value over time of each of the clock inputs 16, 18, the selector 20, and the clock output 14 of the prior art clock switcher circuit 10 is illustrated. The signal values during a switch from clock input 16 to clock input 18 are seen occurring between time 1 and time 2. Because this prior art switcher circuit 10 merely utilizes first one clock input 16 and then switches entirely to the other clock input 18, it is conceivable, as illustrated in FIG. 2, that the switch between clock inputs 16, 18 will result in a clock pulse A which is shorter than the nominal input clock pulse length B of clock input 16, i.e., the source clock input prior to the switch.

Such a short clock pulse A during switch between clock inputs 16, 18 may disturb desired operation of a circuit block sourced by the clock output 14. This is, in particular, the case where the circuit block in general depends on a regular clock pulse, for example, where certain operations within the circuit must be completed during each clock pulse to achieve a desired result from the circuit. For example, if an arbitrarily short pulse were to occur in such a circuit block comprising flip-flops, certain of the flip-flops in the circuit block might not see the short clock pulse. In that instance, those flip-flops which did not see the short clock pulse might for the next pulse be set in an undesired state. Because it would be very hard, if not impossible, to study any given circuit block to determine what might occur in the instance of every possible arbitrarily short clock pulse, it becomes apparent that preventing arbitrarily short clock pulses upon clock switching would be a significant improvement in the prior art clock switcher circuit 10.

Figure 3:
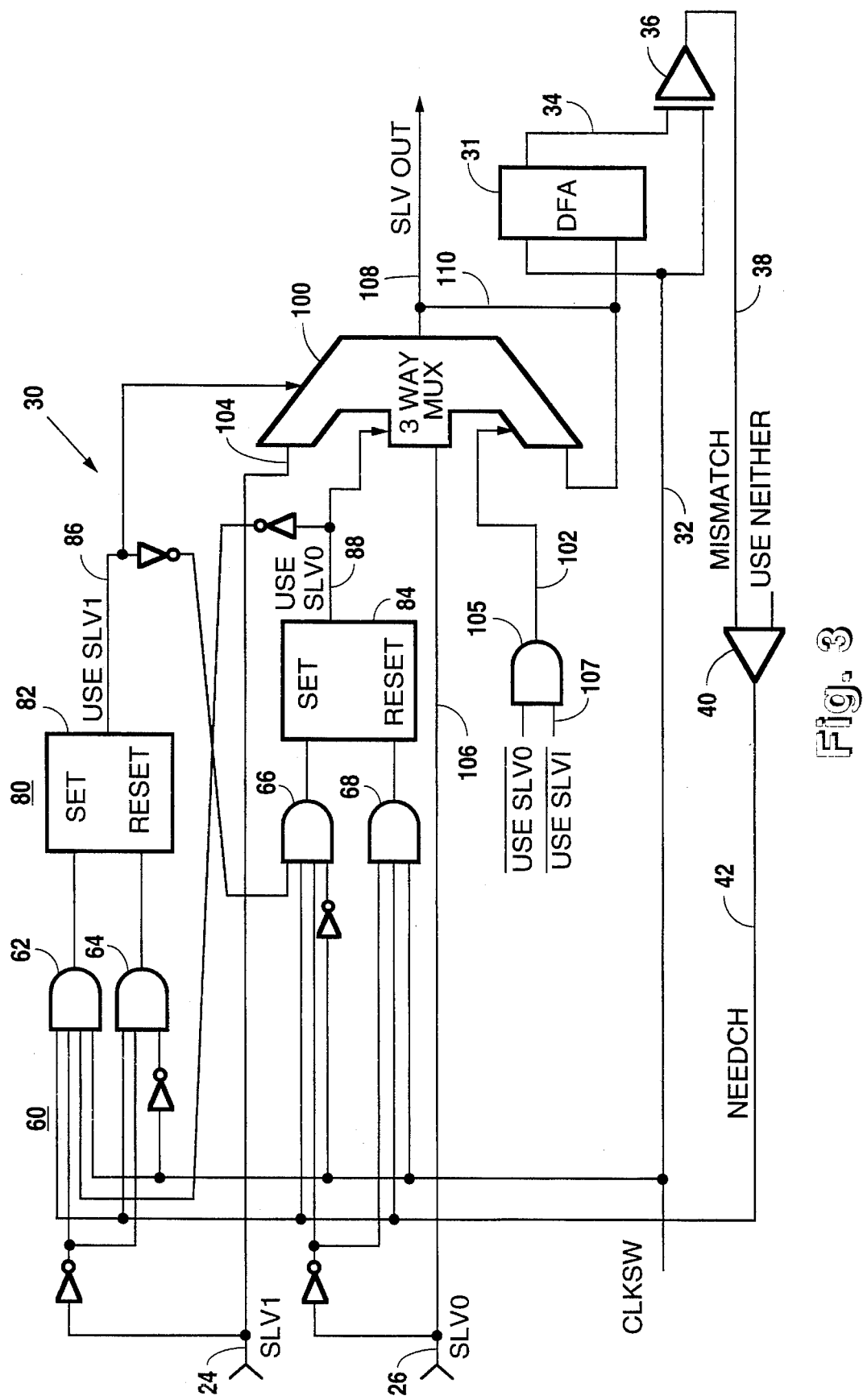
FIG. 3 is a simplified block diagram illustration of the clock switcher circuit of the present invention.

Referring next to FIG. 3, a simplified block diagram illustration of the clock switcher circuit 30 of the present invention is shown. The clock switcher circuit 30 generally includes a flip-flop means 31, an SR latch means 80, a gate means 60 and a MUX means 100. Describing operation of the clock switcher circuit 30 generally, the flip-flop means 31 holds the current state of which clock the circuit is using. In the case of the simplified diagram of FIG. 3, the clocks are identified as clock 0 or clock 1 and corresponding portions of the block diagram circuit are similarly identified to correspond with the two clocks. Also, in this simplified diagram, only the timing slave signals, SLV1 24 and SLV0 26, are shown since clock switching can occur when the example communication channel circuit block previously described is the timing slave, although other conditions are also possible depending on the application and desired effect. Though the figure is intended to illustrate the circuit block of the previously described communication channel, it is to be expressly understood that all variations readily apparent to those skilled in the art are also included in the description and form the invention.

Still referring to FIG. 3, in the flip-flop means 31, the input CLKSW (the clock switch signal) 32, is compared to the flip-flop means output 34 in an exclusive OR gate 36. If the current clock that the circuit block is then using is the same as the clock requested to use, then the current state of the clock remains the same. If, on the other hand, the current clock that the circuit is using is not the same as the clock requested to use, then a mismatch signal 38 is generated. The mismatch signal 38 is passed to a gate 40 and a need change indication 42 is generated. The need change indication 42, which is the output of the gate 40, signals to the rest of the circuit block that a clock change is needed. The need change indication 42 then travels to a gate means 60.

Continuing to refer to FIG. 3, at the gate means 60, the need change indication 42 is fed to a series of gates 62, 64, 66, 68. (For simplification in FIG. 3, the gates 62, 64, 66, 68 of the gate means 60 are shown in simplified form as generic gates.) The gate means 60 transforms the need change indication 42 and supplies an output to an SR latch means 80.

The SR latch means 80 is, in effect, cross-coupled NAND gates 82, 84 and provides appropriate SR latch means output signals 86, 88. These SR latch means output signals 86, 88 are cross-coupled with the gate means 60. The SR latch means output signals 86 then feed a MUX means 100.

Still referring to FIG. 3, the MUX means 100 accepts a signal, for example, signals 104, 106 generated as a timing slave in a preferred embodiment. The MUX means 100 also receives inputs of the SR latch means output signals 86, 88. Output of the MUX means 100 is a timing slave out signal 108 which serves also as a flip-flop clock input signal 110. In this manner the flip-flop clock input signal 110 serves as clock input to the flip-flop means 31 for operation by the flip-flop means 31 of comparing the clock switch signal 32 with the then stored comparison value in the flip-flop means 31, which is the previous flip-flop means output 34 signal, to complete the loop. The timing slave out signal 108 then sources a circuit, such as the previously described communication channel (not shown), with which the clock switcher circuit 30 is employed.

Figure 4:
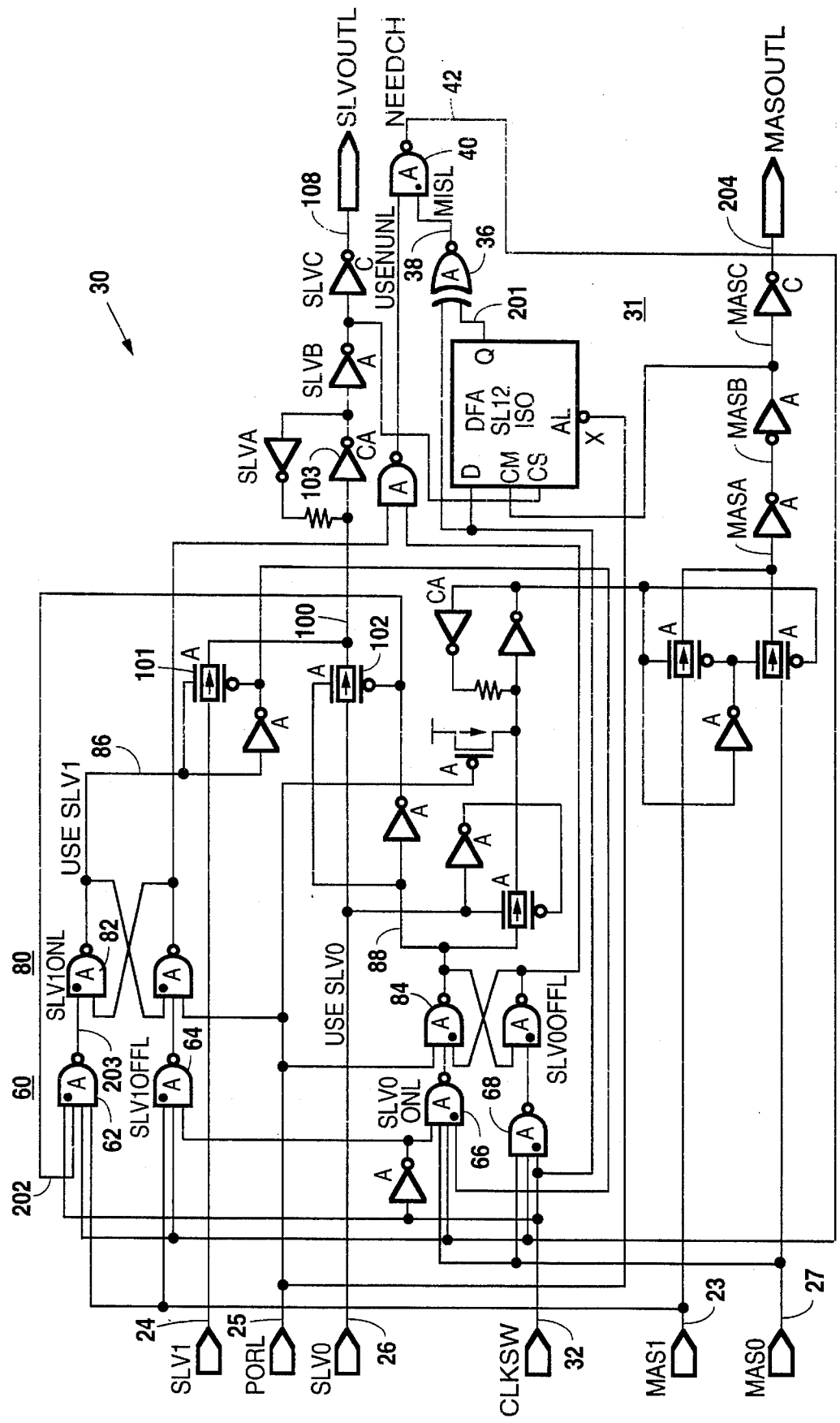
FIG. 4 is a detailed schematic representation of the preferred embodiment of the clock switcher circuit of the present invention.

Referring now to FIG. 4, a preferred embodiment of the clock switcher circuit 30, shown in simplified form in FIG. 3, is illustrated. This preferred embodiment shows both the clock 0 and 1 master and slave timing signals. From this detailed illustration of the preferred embodiment, it is apparent that the gate means 60 includes a series of NAND gates 62, 64, 66, 68. Further, it is apparent that the SR latch means 80 includes two pairs of cross-coupled NAND gates 82, 84. Even further, the MUX means 100 is seen to be a three-way MUX, since when transfer gates 101, 102 are not enabled, feedback 103 feeds back. Each of the gate means 60, the SR latch means 80, and the MUX means 100 is shown in standard logic symbols. Those skilled in the art will readily understand the apparatus shown and illustrated by such symbols. Each of those aspects of the invention, i.e., the gate means 60, the SR latch means 80, and the MUX means 100, are intended as illustrative and for purposes of disclosure of a preferred embodiment. Nonetheless, it is to be expressly understood that any and all variations of those designs which accomplish essentially the same functions in essentially the same manners are also included in this detailed description and form the invention.

Figure 5:
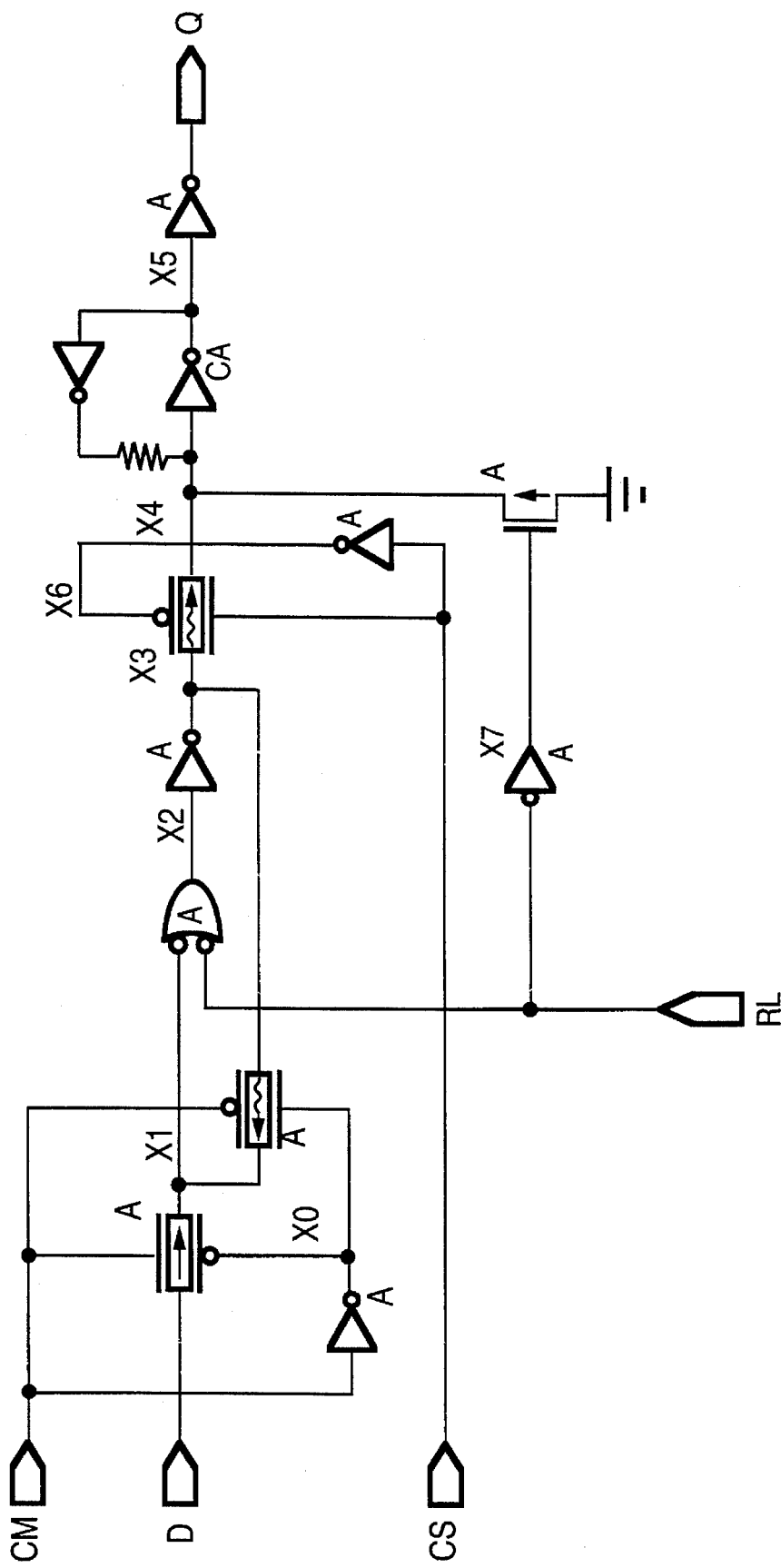
FIG. 5 is a detailed illustration of the DFA block of the preferred embodiment of the clock switcher circuit of the present invention.

Referring next to FIG. 5 in conjunction with FIG. 4, a detailed logic symbol illustration of the flip-flop means 31 is shown. This detailed illustration is the preferred embodiment of the flip-flop means 31. As with the detail shown in FIG. 4 of the other aspects of the clock switcher circuit 30, the symbols shown in FIG. 5 will be readily understood by those skilled in the art. Further, it is to be expressly understood that any and all variations of the circuit design for the flip-flop means 31 in FIG. 5 which perform essentially the same functions in essentially the same manners are included in this detailed description and form the invention.

Figure 6:
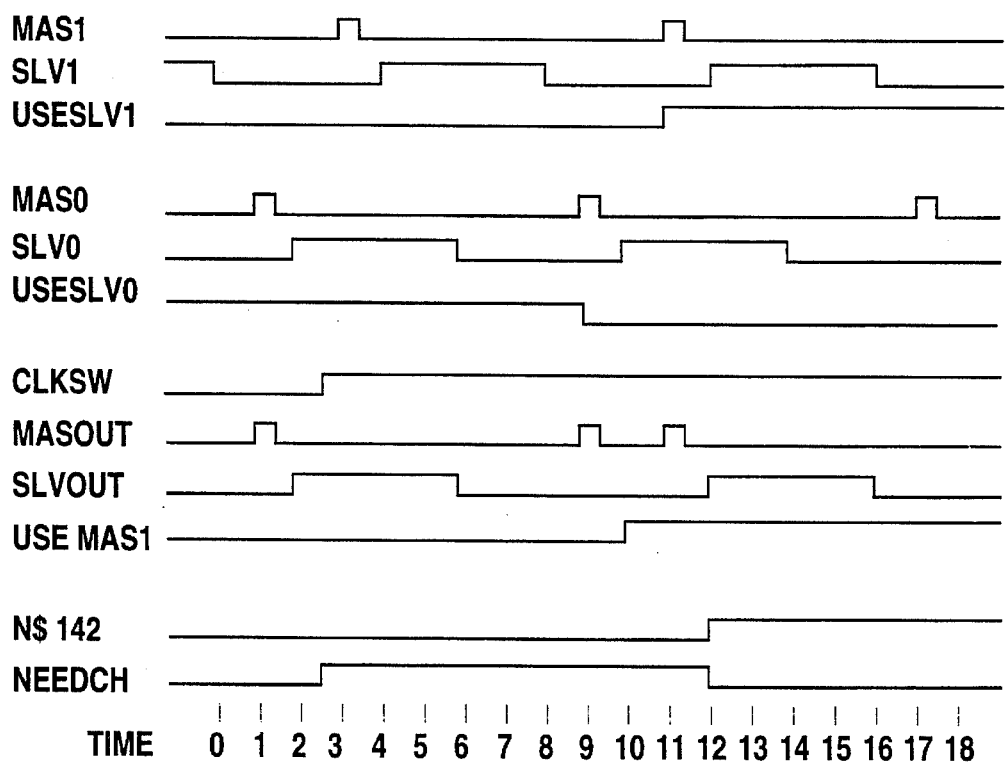
FIG. 6 illustrates the waveform over time of the master and slave inputs, the clock switch signal, and the master and slave outputs, as well as other conditions of the clock switcher circuit of the present invention, when a first clock sources the circuit and then a switch is made to a second clock.
Figure 7:
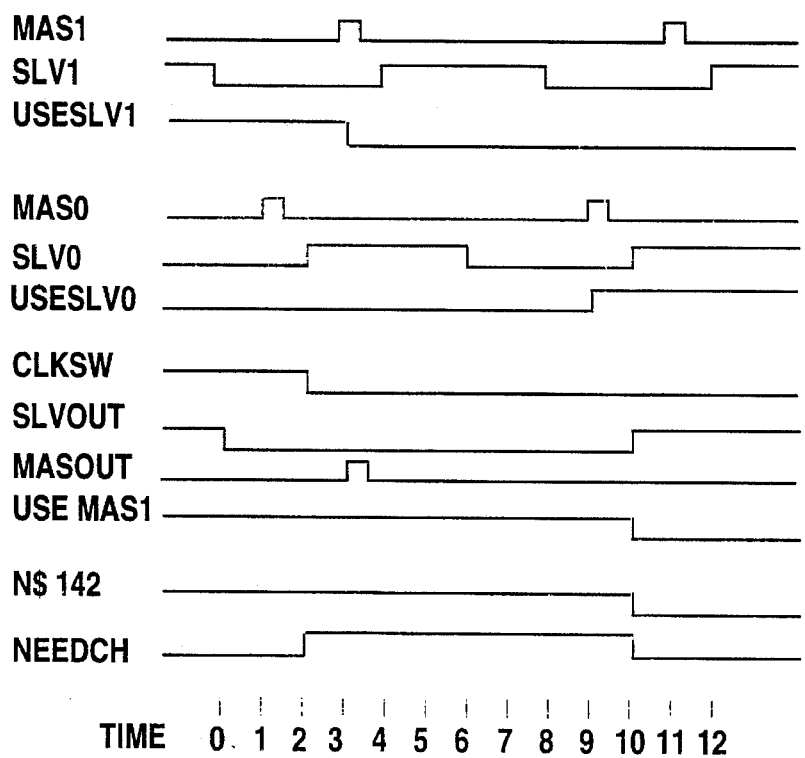
FIG. 7 illustrates the waveform over time of the master and slave inputs, the clock switch signal, and the master and slave outputs, as well as other conditions of the clock switcher circuit of the present invention, when the second clock of FIG. 6 sources the circuit and then a switch is made to the first clock of FIG. 6.

Referring next to FIGS. 6 and 7, signal value over time is illustrated for various of the input, output, and internal connections of the preferred embodiment of the clock switcher circuit 30 shown in FIG. 4. The identifiers used in FIGS. 6 and 7 correspond with those of FIG. 4. FIG. 6, in particular, illustrates an example of switching of clock 0 to clock 1. The CLKSW input (32 in FIG. 4) can be thought of as meaning "request use clock 1" when true and "request use clock 0" when false. MAS1 (23 in FIG. 4) and SLV1 (24 in FIG. 4) are master and slave phases of clock 1. MAS0 (27 in FIG. 4) and SLV0 (26 in FIG. 4) are master and slave phases of clock 0. PORL (25 in FIG. 4) is the reset, active low.

Still referring to FIG. 6, it is seen that CLKSW (32 in FIG. 4) goes from 0 to 1 at time 2.5. This illustrates the case when CLKSW (32 in FIG. 4) is synchronized to SLV0 (26 in FIG. 4), the current clock being used. Because N201 (201 in FIG. 4) still holds the old state, the exclusive NOR gate (36 in FIG. 4) is satisfied, MISL (202 in FIG. 4) is 0, and NEEDCH (42 in FIG. 4) goes to 1. This allows the latches making USESLV0 (88 in FIG. 4) and USESLV1 (86 in FIG. 4) to change. USESLV1 (86 in FIG. 4) cannot be set until USESLV0 (88 in FIG. 4) is cleared, because N202 (202 in FIG. 4) goes into the NAND gate (62 in FIG. 4) that turns SLV1 (24 in FIG. 4) on (i.e., SLV1ONL) (203 in FIG. 4). So things proceed with SLV0 (26 in FIG. 4) controlling the output clock until MAS0 (27 in FIG. 4) goes to 1 at time 9. This turns off USESLV0 (88 in FIG. 4), and the output clock remains at 0 since the weak feedback of feedback 103 is driving it. Notice the output clock, SLVOUT (108 in FIG. 4), stays low at time 10, when SLV0 (26 in FIG. 4) goes to 1. Now that USESLV0 (88 in FIG. 4) is off, N202 (202 in FIG. 4) is a 1, and when MAS1 (23 in FIG. 4) occurs at time 11, USESLV1 (86 in FIG. 4) is set to 1, turning on the transfer gate 101 that connects SLV1 (24 in FIG. 4) to SLVOUT (108 in FIG. 4). When SLV1 (24 in FIG. 4) goes to 1 at time 12, SLVOUT (108 in FIG. 4) also goes to 1. The output clock is now completely switched over to SLV1 (24 in FIG. 4), and the flip flop means (31 in FIG. 4) is clocked, causing N201 (201 in FIG. 4) to go to 1, and MI SL (38 in FIG. 4) goes to 1.

Still referring to FIG. 6, note that SLVOUT (108 in FIG. 4) had its low time lengthened, not shortened, and the clock thus switched over with no undesirable arbitrarily short pulse. MASOUT (204 in FIG. 4) did get double pulsed, at times 9 and again at time 11, but that doesn't cause any problems because the flip-flops (60 in FIG. 4) that these clocks go to change state only when the SLVOUT (108 in FIG. 4) rises, which occurs at time 12.

Next referring to FIG. 7, the wave forms illustrate a switch from clock 1 to clock 0. Again, CLKSW (32 in FIG. 4) is synchronized to SLV0 (26 in FIG. 4). This synchronization shows that the circuit only lengthens clock periods for the case when CLKSW (32 in FIG. 4) is synchronized to the clock to which the switch is being made. In FIG. 6, CLKSW (32 in FIG. 4) was synchronized to the clock from which being switched. Note that CLKSW (32 in FIG. 4) is synchronized to one clock or the other, and isn't completely asynchronous. If in an instance it is the case that CLKSW (32 in FIG. 4) is asynchronous, it may be synchronized by one of the input clocks.

Still referring to FIG. 7, it is apparent that in this switch when CLKSW (32 in FIG. 4) goes to 0 at time 2, NEEDCH (42 in FIG. 4) goes to 1. Further, when MAS1 (23 in FIG. 4) goes to 1 at time 3, USESLV1 (86 in FIG. 4) goes to 0, leaving SLVOUT (108 in FIG. 4) in its last state. Then when MAS0 (27 in FIG. 4) occurs at time 9, USESLV0 (88 in FIG. 4) is set to 1, making SLV0 (26 in FIG. 4) control the SLVOUT (108 in FIG. 4). At time 10, SLV0 (26 in FIG. 4) goes to 1 and SLVOUT (108 in FIG. 4) goes to 1. The switching is complete, the flip-flop means 31 is clocked, making N201 (201 in FIG. 4) go to 0 and NEEDCH (42 in FIG. 4) go to 0.

Referring back now to FIG. 3, as is readily apparent from the conceptual logic diagram of FIG. 3, the concept of this invention may also be applied by those skilled in the art to applications for single phase clocks. In that case, the MUX for MASOUT (204 in FIG. 4) is eliminated and USESLV1 107 goes into the NAND gate 105 where MAS1 (23 in FIG. 4) appears in FIG. 4. Those skilled in the art will readily recognize and understand the possibilities for those single phase clock applications, therefore, each and every of those applications and the respective configurations of the circuit 30 are included in and form the invention.

As is clearly seen, the present invention overcomes the problems presented by the prior devices and methods. The present invention is believed to be especially effective when configured and employed as described herein, however, those skilled in the art will readily recognize that numerous variations and substitutions may be made in the device and its use and configuration to achieve substantially the same results as achieved by the embodiments and, in particular, the preferred embodiments, expressly described herein. Each of those variations is intended to be included in the description herein and forms a part of the present invention. The foregoing detailed description is, thus, to be clearly understood as being given by way of illustration and example only, the spirit and scope of the present invention being limited solely by the appended claim.

What is claimed is:

1. A clock switcher circuit for providing at least one set of clock signals selected from a plurality of clock sources, said clock switcher circuit preventing shorter than a normal pulse length of an old clock source, said normal pulse length having a leading edge and a trailing edge, upon switch to a new clock source comprising:

a flip-flop for holding a state indicating which of said plurality of clock sources is then being used to provide said at least one set of clock signals, comparing said state to a selector signal indicating which of said plurality of clock sources should be used, and generating a mismatch signal if said state differs from said selector signal;

a gate for selectively outputting at least one response signal in response to said mismatch signal from said flip-flop said gate having inputs of said selector signal, said mismatch signal, and said at least one set of clock signals;

an SR latch for generating at least one set/reset output signal, said SR latch having inputs of said at least one response signal, said at least one set/reset output signal being looped to set said gate; and a MUX for generating said at least one set clock signals, said MUX having inputs of said plurality of clock sources, and said at least one set/reset output signal, said at least one set of clock signals dictating said state of said flip-flop; wherein said switch to said new clock source is not triggered by said leading edge or said trailing edge.

2. A clock switcher circuit for providing at least one set of clock signals selected from a plurality of clock sources, said clock switcher circuit preventing shorter than a normal pulse length of an old clock source, said normal pulse length having a leading edge and a trailing edge, upon switch to a new clock source, comprising:

a flip-flop for holding a state indicating which of said plurality of clock sources is then being used to provide said at least one set of clock signals, comparing said state to a selector signal indicating which of said plurality of clock sources should be used, and generating a mismatch signal if said state differs from said selector signal;

a gate for selectively outputting at least one response signal in response to said mismatch signal from said flip-flop, said gate having inputs of said selector signal, said mismatch signal, and said at least one set of clock signals;

an SR latch for generating at least one set/reset output signal, said SR latch having inputs of said at least one response signal, said at least one set/reset output signal being looped to set said gate; and a MUX for generating said at least one set of clock signals, said MUX having inputs of said plurality of clock sources, and said at least one set/reset output signal, said at least one set of clock signals dictating said state of said flip-flop;

wherein said circuit is operable with multi-phase clocks; and wherein said switch to said new clock source is not triggered by said leading edge or said trailing edge.

3. A clock switcher circuit for providing at least one set of clock signals selected from a plurality of clock sources, said clock switcher circuit preventing shorter than a normal pulse length of an old clock source, said normal pulse length having a leading edge and a trailing edge, upon switch to a new clock source, comprising:

a flip-flop for holding a state indicating which of said plurality of clock sources is then being used to provide said at least one set of clock signals, comparing said state to a selector signal indicating which of said plurality of clock sources should be used, and generating a mismatch signal if said state differs from said selector signal;

a gate for selectively outputting at least one response signal in response to said mismatch signal from said flip-flop, said gate having inputs of said selector signal, said mismatch signal, and said at least one set of clock signals;

an SR latch for generating at least one set/reset output signal, said SR latch having inputs of said at least on response signal, said at least one set/reset output signal being looped to set said gate; and a MUX for generating said at least one set of clock signals, said MUX having inputs of said plurality of clock sources, and said at least one set/reset output signal, said at least one set of clock signals dictating said state of said flip-flop;

wherein said circuit chooses between any of a plurality of clock inputs as said at least one set of clock signals;

wherein said switch to said new clock source is not triggered by said leading edge or said trailing edge.

4. A circuit for outputting a selected clock signal, said selected clock signal being a pulsed signal having a leading edge and a trailing edge, comprising:

a plurality of clock inputs, each of said inputs being pulsed signals;

a signal indicating which of said plurality of clock inputs is to be output by said circuit;

a means for generating said selected clock signals form said plurality of clock inputs, said means for generating being operatively connected and responsive to said signal; and a means for switching said selected clock signal to another of said plurality of clock inputs if said selected clock signal differs from said clock input indicated by said signal said means for switching being operatively connected and responsive to said signal; wherein said means for switching is not triggered by said leading edge or said trailing edge.

5. A circuit for outputting a selected clock signal, said selected clock signal being a pulsed signal having a leading edge and a trailing edge, comprising:

a plurality of clock inputs, each of said inputs being pulsed signals;

a signal indicating which of said plurality of clock inputs is to be output by said circuit;

a means for generating said selected clock signals form said plurality of clock inputs, said means for generating being operatively connected and responsive to said signal;

a means for switching said selected clock signal to another of said plurality of clock inputs if said selected clock signal differs from said clock input indicated by said signal, said means for switching being operatively connected and responsive to said signal; and a means for preventing said means for switching from switching said selected clock signal to another of said plurality of clock inputs if said switching would cause said selected clock signal to generate a pulse signal less than the normal pulse signal of said selected clock signal; wherein said means for switching is not triggered by said leading edge or said trailing edge.

6. A circuit for outputting a selected clock signal, said selected clock signal being a pulsed signal having a leading edge and a trailing edge, comprising:

a plurality of clock inputs, each of said inputs being pulsed signals;

a signal indicating which of said plurality of clock inputs is to be output by said circuit;

a means for generating said selected clock signals form said plurality of clock inputs, said means for generating being operatively connected and responsive to said signal;

a means for switching said selected clock signal to another of said plurality of clock inputs if said selected clock signal differs from said clock input indicated by said signal, said means for switching being operatively connected and responsive to said signal; and a means for preventing said means for switching from switching said selected clock signal to another of said plurality of clock inputs if said switching would cause said selected clock signal to generate a pulse signal less than the normal pulse signal of said selected clock signal;

wherein said circuit is operable with multi-phase clock inputs; wherein said means for switching is not triggered by said leading edge or said trailing edge.

7. A circuit for outputting a clock signal, comprising:

a first clock signal input having a first pulse length;

a second clock signal input having a second pulse length;

a clock selection input;

a means for outputting whichever of said first clock signal input or said second clock signal is indicated by said clock selection input; and a means, responsive to said clock selection input, for preventing said means for outputting from switching between said first clock signal input to said second clock signal input until said second pulse length output by said means for outputting will be at least as long as said first pulse length and from switching between said second clock signal input to said first clock signal input until said first pulse length output by said means for outputting will be at least as long as said second pulse length;

wherein said switching is not triggered by termination of said first pulse length and said second pulse length.

8. The circuit of claim 7, wherein said first clock signal input and said second clock signal are multi-phase clocks.

9. The circuit of claim 7, further comprising a plurality of additional clock signal inputs each having a particular pulse length, wherein said clock selection input selects any of said plurality to be said output clock signal and said output clock signal has a pulse length at all times at least as great as the pulse length of any of said plurality.

10. The circuit of claim 9, wherein said plurality are multi-phase clocks.

* * * * *

UNITED STATES PATENT AND TRADEMARK OFFICE
CERTIFICATE OF CORRECTION

PATENT NO. : 5,502,409
DATED : March 26, 1996
INVENTOR(S) : Paul G. Schnizlein and David E. Norris It is certified that error appears in the above-indentified patent and that said Letters Patent is hereby corrected as shown below:

```
In column 6, line 51, the term "MI SL" should read --MISL--;
In column 8, line 1, insert --of-- between "set" and "clock";
In column 8, line 57, the term "on" should read --one--;
In column 9, line 29, the term "signals form" should read--signal
   from--;
In column 9, line 47, the term "pulsed signal" should be followed
   by --,--; and
In column 10, line 1, the term "signals form" should read
   --signal from--.
```

Signed and Sealed this

Twenty-fourth Day of September, 1996

Attest:

BRUCE LEHMAN

*Attesting Officer*   *Commissioner of Patents and Trademarks*